Oct. 8, 1946.  J. J. BLOOMFIELD  2,409,099
BRAKE COOLER
Filed July 12, 1943  2 Sheets-Sheet 1

Inventor
John J. Bloomfield
By George C. Sullivan
Agent

Oct. 8, 1946.   J. J. BLOOMFIELD   2,409,099
BRAKE COOLER
Filed July 12, 1943   2 Sheets-Sheet 2
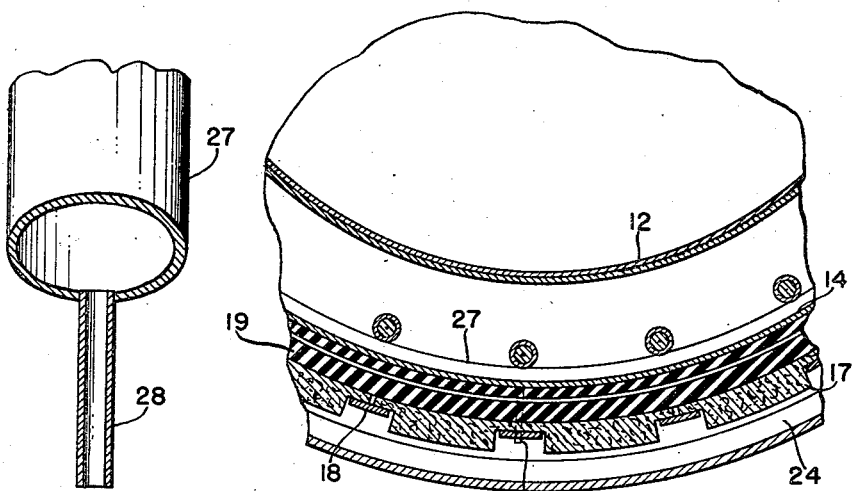
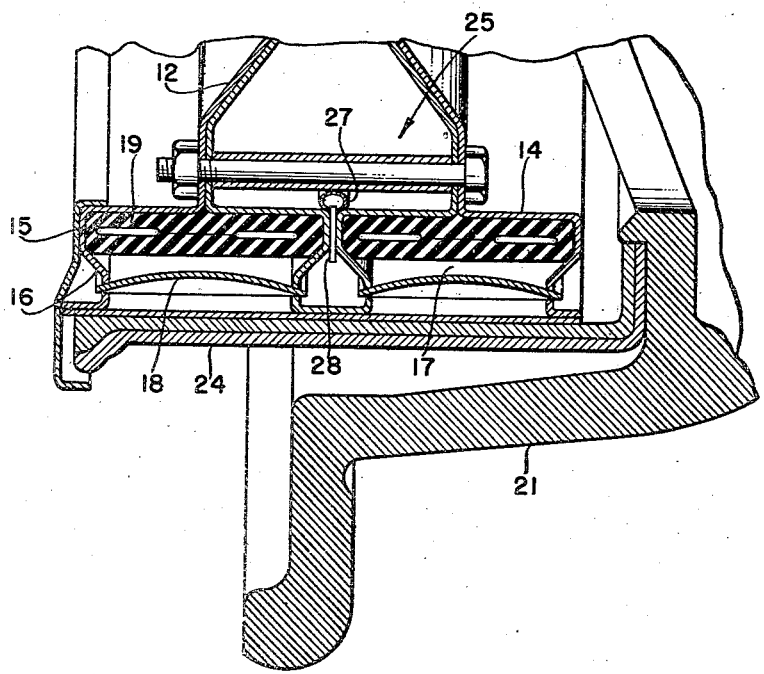
INVENTOR.
JOHN J. BLOOMFIELD
BY
*George C. Sullivan*
Agent Patented Oct. 8, 1946

2,409,099

UNITED STATES PATENT OFFICE 2,409,099

BRAKE COOLER

John J. Bloomfield, Burbank, Calif., assignor, by mesne assignments, to Lockheed Aircraft Corporation, a corporation of California Application July 12, 1943, Serial No. 494,330

8 Claims. (Cl. 188—264)

This invention relates to brakes and relates more particularly to brake mechanisms embodying means for dissipating the heat generated as a result of the braking action. A general object of the invention is to provide brake mechanisms having practical, dependable and very effective means for dissipating the heat generated during the braking operation.

The present invention, while not confined to any given application or field, is well suited for embodiment in the brake systems of airplane landing wheels. Accordingly, the invention will herein be referred to as used in such systems, it being understood that this is merely one typical application and is not to be construed as limiting either the scope or the application of the invention.

When the brakes of airplane landing wheels are operated high temperatures are created in the brake mechanisms producing rapid deterioration of the expander tubes, brake lining, tires, etc. Only a small portion of the heat energy generated is immediately dissipated by atmospheric convection and radiation, and the balance is absorbed by the brake mechanism with damaging results.

An important object of this invention is to provide a brake mechanism embodying means for supplying a liquid coolant to the brake drum, shoes and adjacent parts to effect a rapid and efficient transference of the heat generated during braking.

Another object of the invention is to provide a brake cooling means of the character referred to in which the cooling medium, for example water, is caused to vaporize upon delivery to the heated parts or immediately thereafter.

Another object of the invention is to provide a brake cooling means of the character referred to having a time delay or control means that delays the initial delivery of the water to the brake parts until the maximum brake pressure is approached. This feature avoids the unnecessary delivery of the coolant during taxiing and similar operations when the brake is employed, but is not subject to overheating.

Another object of the invention is to provide a brake cooling means of the character referred to having a practical and dependable metering means for insuring the delivery of a given quantity of coolant to the brake parts at each operation and preventing excessive and prolonged discharge of the coolant.

Another object of the invention is to provide a brake cooling means of the character mentioned in which the pressure for the delivery or discharge of the water is obtained from the hydraulic brake operating system and the above mentioned control and measuring means is operated by the pressure of the hydraulic brake operating system, thereby eliminating the necessity for additional power or operating means.

Another object of the invention is to provide a brake cooling means that requires little or no modification of the conventional landing gear, brake and wheel structures.

A further object of the invention is to provide brake cooling means of the character referred to that cannot interfere with the normal operation of the brake system and that requires a minimum of additional weight in the assembly.

Other objects and features of the invention will be readily understood from the following detailed description of a typical preferred form of the invention throughout which reference is made to the accompanying drawings in which:

Figure 4 is a fragmentary vertical cross sectional view taken as indicated by line 4—4 on Figure 2.

Figure 5 is an enlarged cross sectional view of the discharge manifold, and

Figure 6 is an enlarged fragmentary sectional view of the brake means and associated parts.

Figures 1, 2, 3:
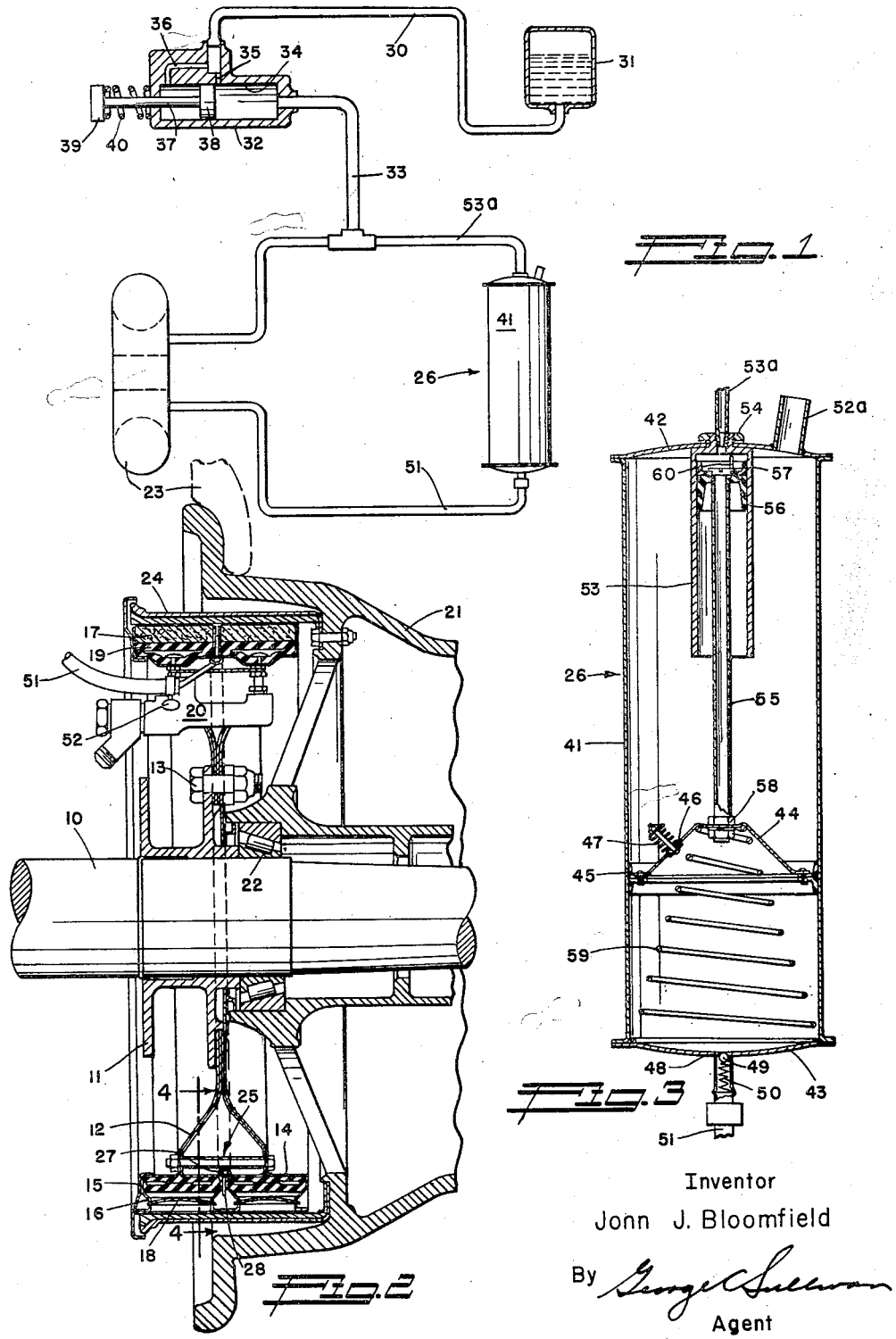
Figure 1 is a flow diagram of one form of the invention associated with a brake operating system.
Figure 2 is an enlarged vertical cross section of a portion of a landing wheel and axle assembly illustrating the brake means, and a cooling means of the invention.
Figure 3 is an enlarged longitudinal detailed sectional view of the measuring means embodied in the device of Figures 1 and 2.

In the drawings there is illustrated a portion of a typical landing wheel and brake assembly. This assembly includes a relatively stationary axle 10 and a brake supporting structure secured to the axle. Said structure includes a hub or collar 11 fixed or keyed to the axle 10 and an annular carrier 12 secured to the collar 11 by bolts 13. The outer portion of the carrier 12 supports a rim 14. In the case illustrated, the rim 14 has two continuous channels 15 whose side walls are provided with pairs of opposing lugs 16. Segmental shoes 17 of friction material are engaged in the channels 15 and the end portions of the shoes are reduced in width to cooperate with the lugs 16. Inwardly bowed leaf springs 18 have their ends anchored in the lugs 16 and bear inwardly against the reduced end portions of the shoes 17 to yieldingly urge the shoes inwardly. Expander tubes 19 of flexible resilient material such as synthetic rubber, are provided within the channels 15 at the inner sides of the series of shoes 17.

A manifold fitting 20 communicates with the interiors of the expander tubes 19 and fluid pressure is supplied to the fitting to expand the tubes as will be more fully described.

A wheel assembly 21 is supported on the axle 10 by bearings 22 and the rim of the wheel carries the usual tire 23. A brake drum 24 is bolted or otherwise fixed to an end of the wheel assembly 21 and extends axially therefrom to be in surrounding relation to the brake shoes 17. Upon the delivery of fluid pressure to the interiors of the expander tubes 19 the tubes expand and force the shoes 17 radially outward into braking engagement with the drum 24. The structure thus far described may be considered as conventional.

The brake cooling means of the invention illustrated may be said to comprise generally means 25 for supplying water or other coolant to the brake parts that are subject to overheating, and controlled means 26 for supplying the water to the means 25.

The means 25 serves to discharge or spray the water onto the drum 24, brake shoes 17, etc. The means 25 includes an annular, tubular manifold 27 engaged or secured on the internal surface of the rim 14. The manifold 27 is preferably positioned to lie in the radial plane which extends between the sets of shoes 17. A plurality of circumferentially spaced nozzle tubes 28 is carried by the manifold 27. The discharge tubes 28 extend outwardly through openings in the rim 14 and are received between the shoes 17 of the two series of shoes. The outer ends of the discharge tubes 28 are spaced from the active faces of the brake shoes 17 and the internal surface of the drum 24 to permit an effective dispersion of the discharged water. The cross sectional dimension of the fluid passage in the manifold 27 is greater than the aggregate cross sectional areas of the passages in the tubes 28 to insure a substantially uniform delivery of water to the several tubes. It will be observed that the coolant or water discharging means 25 just described is extremely simple and is very light in weight.

The means 26 serves to deliver a given quantity of water to the means 25 when the maximum or a high braking pressure is approached. The means 26 is associated with the hydraulic brake operating system and is such that it may be employed with hydraulic systems of different characters. As diagrammatically illustrated in Figure 1, the hydraulic brake system includes a liquid supply line 30 leading from a liquid supply 31 to a master cylinder 32. A line 33 extends from the master cylinder 32 to the above mentioned manifold 20 to be in communication with the interiors of the expander tubes 19. The line 33 communicates with the inner or forward end of the cylinder opening 34 of the master cylinder 32. Ports 35 and 36 communicate with the cylinder opening 34 at longitudinally spaced points and lead to the fluid supply line 30. A rod 37 enters the rear end of the cylinder opening 34 and carries a piston 38 for operation in the opening. A head 39 is provided on the outer end of the rod 37 and a spring 40 is arranged under compression between the head 39 and the end of the cylinder 32 to normally urge the rod 37 outwardly so that the piston 38 normally occupies the rear portion of the cylinder opening 34.

When the piston rod 37 is actuated inwardly or forwardly the piston 38 moves forwardly past the port 35 to trap a body of liquid in the forward portion of the cylinder opening and upon continued movement of the piston the liquid in the forward portion of the cylinder, the line 36 and the interiors of the expander tubes 19 is put under pressure so that the tubes are expanded to actuate the brake shoes 17 outwardly against the drum 24. The port 36 acts as a bleed port to permit unrestrained operation of the piston 38.

The means 26 further includes a measuring container or cylinder 41. The cylinder 41 may be located in any selected or desirable part of the craft. As illustrated in the drawings, the cylinder 41 is elongate and is arranged in an upright or vertical position. The upper and lower ends of the cylinder 41 are provided with heads 42 and 43. A piston 44 of frusto conical configuration is operable in the cylinder 41. Sealing elements 45 are provided on the piston 44 to slidably seal with the wall of the cylinder 41. The piston 44 is in the lower portion of the cylinder 41 and is valved to serve as a measuring piston. A port or opening is provided in the piston 44 and is controlled by a valve 46 normally urged upwardly against the under side of the piston, by a spring 47, to close the opening. An outlet port 48 is provided in the lower head 43 and is controlled by a valve 49. A spring 50 normally urges the valve 49 upwardly to the closed position. A fluid line 51 extends from the valve controlled port 48 in the lower end of the cylinder 41 to the above described manifold 27 at the brake assembly. If desired, a manually operable valve controlled fitting 52 may be provided in the line 51 adjacent to the manifold 27. An inlet or filling fitting 52a is provided in the upper head 42 of the cylinder 41 so that water may be supplied to the cylinder.

The means 26 further includes a pressure cylinder 53 axially disposed within the upper portion of the metering cylinder 41. The effective diameter of the pressure cylinder 53 is considerably smaller than the effective diameter of the measuring cylinder 41. The cylinder 53 is secured to the upper head 42 by a nut 54 and extends downwardly in the cylinder 41. A fluid line 53a communicates with the upper end of cylinder 53 and extends to the pressure line 33. A tubular rod 55 enters the lower end of the cylinder 53 and carries a piston 56 which slidably operates in the cylinder. A flanged plug 57 closes the upper end of the tubular rod 55 and aids in securing the piston to the rod. The piston 56 is designed to seal against pressures on both of its sides to prevent a co-mingling of the hydraulic brake fluid and the water. The piston 56 is operated downwardly by pressure developed by the operation of the piston 38 in the master cylinder 32. The pressure piston 56 and the metering piston 44 are rigidly coupled by the rod 55. Nuts 58 attach the piston 44 to the lower end of the rod 55.

The invention includes means for resisting downward movement of the metering cylinder 44 until the effective or maximum fluid pressure is developed in the expander tubes 19 of the brake. This means comprises a coiled upwardly tapering spring 59 arranged under compression between the lower cylinder head 43 and the under side of the piston 44. The resistance to downward movement of the piston 44 offered by the spring 59 is so related to differential in the diameters of the pistons 44 and 56 and the pressures developed in the master cylinder 32 that the piston 44 does not move downwardly until effective or relatively high brake operating pressures have been developed in the master cylinder. As a result of this relationship there is no discharge of water from the nozzle tubes 28 until the brake parts have been heated by substantial braking pressures.

In addition to resisting downward movement of the piston 44 during brake operation, the spring 59 serves to return the pistons 44 and 56 to their normal positions when pressure is relieved from the master piston rod 37 and the master piston returns to its normal position. It will be seen that upon downward movement of the piston 44 the valve 46 remains closed and the check valve 49 opens to allow the delivery of a given quantity of water to the nozzle tubes 29. Upon return movement of the piston 44, the check valve 49 is closed and the valve 46 opens to allow a given quantity of water to pass from the upper side of the piston 44 to the lower side of the piston. In this connection, a stop 60 may be provided on the plug 57 to engage the upper wall of the pressure cylinder 53 to limit the upward travel of the piston 44 and thus definitely limit the quantity of water that passes to the under side of the piston at each operation. The cylinder 41 may be proportioned to contain a plurality of the measured charges of water so that the system remains available and operative for several complete actuations of the brake means.

It is believed that the operation of the apparatus will be understood from the foregoing description. Assuming that the cylinder 41 contains several charges of water and that the metering means has been primed so that a charge of water is below the piston 44, the apparatus is conditioned for operation. Upon landing of the craft and when the brakes are applied, the piston 38 is moved forwardly in the master cylinder 32 to cut off the port 35 and subject the liquid in the brake line 33 to pressure. This pressure expands the tubes 19 so that the shoes 17 are brought into braking engagement with the rotating drum 24. As a result of this initial braking action, considerable heat is generated and the brake assembly parts become heated. When maximum braking pressure is approached the fluid pressure in the line 33 and the upper end of the cylinder 53 forces the piston 56 downwardly. It is to be observed that there is a substantial differential in the diameters of the pistons 56 and 44 and that the spring 59 resists downward movement of the piston 56 until substantial pressures have been developed in the upper end of the cylinder 53. Downward movement of the piston 56 is accompanied by downward movement of the piston 44 and downward movement of the latter piston causes the charge of water below that piston to be discharged through the line 51 to the nozzle tubes 28. The water is discharged in small streams from the nozzle tubes 28 and while it may contact the drum 28 and shoes 17, it almost immediately flashes into vapor or steam. This results in an effective transference of heat from the brake parts and the brake parts do not become overheated. The water does not form a layer or film to interfere with the braking action. The steam produced by the vaporization of the water is free to escape to the atmosphere. When pressure is relieved from the head 39 of the master piston rod 37 the piston 38 is restored to its normal position by the spring 40 so that pressure is removed from the interiors of the expander tubes 19 and the pressure cylinder 53. The spring 59 restores the pistons 56 and 44 to their normal positions and upon restoration of the piston 44 the valve 46 opens to allow a charge of water to pass below the piston to recondition the system for the next operation.

Having described only a typical form of the invention, I do not wish to be limited to the specific details herein set forth, but wish to reserve to myself any variations or modifications that may appear to those skilled in the art or fall within the scope of the following claims.

I claim:

1. In a brake system having a brake drum, friction means operable into cooperation with the drum and a fluid pressure system for operating the friction means, the combination of coolant discharge means for discharging coolant adjacent the drum and friction means, and means controlled and operated by said fluid pressure system for supplying coolant under superatmospheric pressure to the discharge means including piston means actuated by the fluid pressure in said system and operable to impose pressure on the coolant to force the same to the discharge means.

2. In a brake system having a brake drum, friction means operable into cooperation with the drum and a fluid pressure system for operating the friction means, the combination of coolant discharge means for discharging coolant adjacent the drum and friction means, and means controlled by the pressure in said system for supplying a measured quantity of coolant under pressure to the discharge means after operation of the friction means has commenced including a metering piston actuated by the fluid pressure in said system to displace a given quantity of coolant to the discharge means.

3. In a brake system having a brake drum, friction means operable into cooperation with the drum and a fluid pressure system for operating the friction means, the combination of coolant discharge means for discharging coolant adjacent the drum and friction means, and means operated by the pressure in said system for supplying a measured quantity of coolant to the discharge means during each operation of the friction means, the last named means including a coolant container, a piston operable in the container for displacing coolant therefrom to the discharge means and cylinder and piston means associated with said system for operating the piston.

4. In a brake system having a brake drum, friction means operable into cooperation with the drum and a fluid pressure system for operating the friction means, the combination of coolant discharge means for discharging coolant adjacent the drum and friction means, and means operated by the pressure in said system for supplying a measured quantity of coolant to the discharge means during each operation of the friction means, the last named means including a coolant container, a piston operable downwardly in the lower portion of the container for displacing a measured quantity of coolant therefrom to the discharge means, cylinder and piston means associated with said system for operating the piston downwardly, means for returning the piston, and valve means for admitting coolant to below the piston during the return of the piston.

5. In a brake system having a brake drum, friction means operable into cooperation with the drum and a fluid pressure system for operating the friction means, the combination of a manifold within the drum, spaced means on the manifold for discharging the coolant against the drum, and cylinder and piston means responsive to pressure developed in said system for forcing coolant under pressure to the manifold during operation of the friction means.

6. In a brake system having a brake drum, friction means operable into cooperation with the drum and a fluid pressure system for operating the friction means, the combination of an annular manifold within the drum, circumferentially spaced means on the manifold for discharging coolant therefrom against the drum, and means actuated by the pressure developed in said system for supplying a measured quantity of coolant to the manifold during each operation of the friction means.

7. Cooling means for a brake mechanism having a drum, friction means for cooperating with the drum and a hydraulic pressure system operable to develop pressure for operating the friction means, the cooling means comprising discharge means adjacent the drum and friction means for discharging water thereon, pump means for supplying water under pressure to the discharge means, and means governed by the pressure in said system for controlling the action of the pump means.

8. Cooling means for a brake mechanism having a drum, friction means for cooperating with the drum and a hydraulic pressure system operable to develop pressure for operating the friction means, the cooling means comprising discharge means adjacent the drum and friction means for discharging water thereon, water supply means, pump means for delivering water under pressure to said discharge means, and means under the control of the pressure in said system for controlling communication between the supply means and pump means.

JOHN J. BLOOMFIELD.